July 21, 1959    J. S. PILCH    2,895,236
HYDRAULIC ADZE
Filed Sept. 25, 1956

INVENTOR.
JOHN S. PILCH
BY
Raymond A. Vaquin
ATTORNEY.

2,895,236

HYDRAULIC ADZE

John S. Pilch, Ware, Mass.

Application September 25, 1956, Serial No. 612,008

1 Claim. (Cl. 37—2)

This invention relates to cutting apparatus and more particularly to new and improved apparatus for rapidly and efficiently cutting off or removing stumps below ground level without digging.

An object of the invention is to provide a new and improved stump removing or cutting apparatus of the type set forth.

Another object is to provide a device of the type set forth which has a removable cutting blade whereby the blade may be sharpened or changed.

Another object is to provide a device of the type set forth which is tractor mounted and hydraulically actuated.

Other objects and advantages of the invention will be apparent from the following description taken in connection with the accompanying drawings.

Referring to the drawings.

Figure 1:
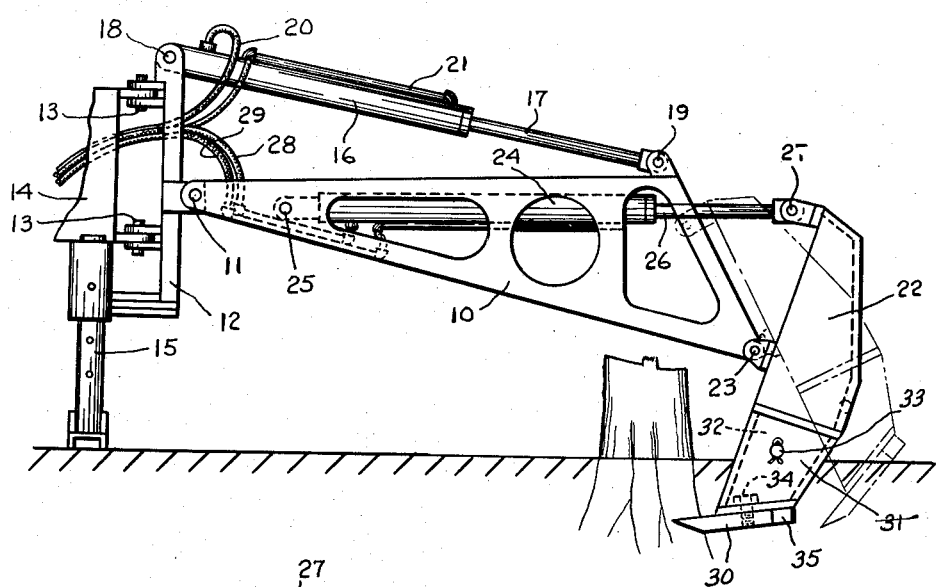
Fig. 1 is a side view of an apparatus embodying the invention.
Figure 2:
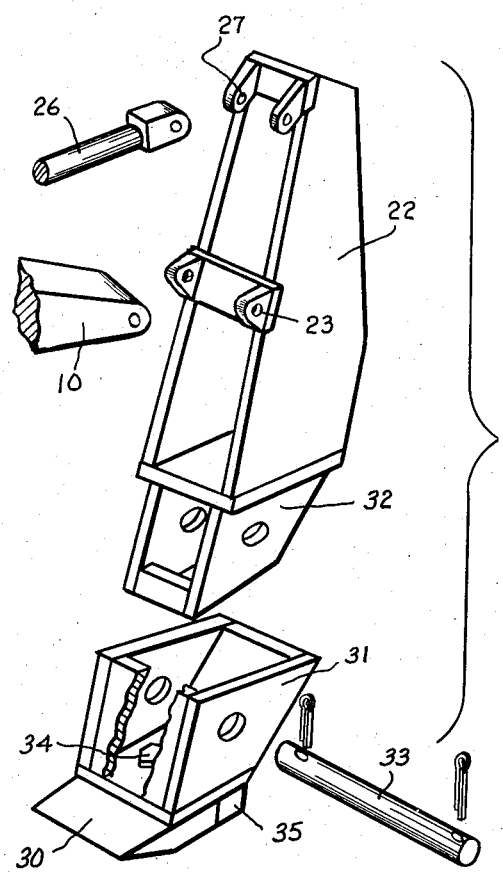
Fig. 2 is a fragmentary view on an enlarged scale, of the apparatus shown in Fig. 1.

Referring more particularly to the drawings wherein similar reference characters designate corresponding parts throughout the device shown in Fig. 1 comprises a boom 10 which is pivotally connected by horizontal pivot 11 to support 12 which is pivotally connected by vertical pivots 13 to support 14 which is adapted to be tractor mounter as disclosed in my application Serial Number 438,413 filed June 22, 1954 and now Patent No. 2,846,094. The stabilizer or supports 15 are provided for support and rigidity.

The double acting hydraulic cylinder 16 and ram 17 are connected at 18 and 19 to support 12 and boom 10, respectively, for raising and lowering the boom 10 and cylinder 16 is connected by hydraulic lines 20 and 21 to a source of hydraulic pressure in the usual manner.

Support 22 is pivotally connected intermediate its ends to boom 10 adjacent its free end at 23, and support 22 is adapted to be pivoted by double acting cylinder 24 which is pivotally connected to boom 10 at 25 and ram 26 which is pivotally connected to support 22 on one side of pivot 23 at 27, preferably near the free end of said support 22.

Cylinder 24 is connected by hydraulic lines 28 and 29 to a source of hydraulic power.

Support 22 carries chopping blade 30 on the end thereof opposite pivotal connection 27. Cutting blade 30 is carried by shoe 31 which fits over reduced end 32 of support 22 and is retained thereon by bolt or the like 33 which is positioned in aligned openings in shoe 31 and reduce end 32.

Chopping blade 30 may be removably secured to shoe 31 by bolt or bolts 34 which are threaded through the end of shoe 31 into chopper blade 30 and reinforcement 35 may be provided on the end of shoe 31 for reinforcing or backing up chopping blade 30.

In operation, the boom is moved over the stump to be removed and support 22 pivoted by hydraulic pressure and the stump can then be cut off or sliced off by rapid successive cuts of high force due to high hydraulic pressure until the stump is cut off a sufficient distance below ground level.

From the foregoing, it will be seen that I have provided new and improved means for obtaining all of the objects and advantages of the invention.

I claim:

In a machine of the type described having a boom, equipped with an implement operating hydraulic ram, a horizontal pivot means at the end of said boom, a chopping device for mounting on said boom, said chopping device comprising an elongated rigid box-like support element, a pivot connection approximately mid length of said rigid support element, said pivot connection being complementary to the pivot means of said boom for cooperation therewith when said rigid support element is mounted on said boom with one end of said rigid support element extending generally upwardly, and the other end extending generally downwardly from said boom, a pivot connection on said rigid support element at its end extending upwardly from said boom adapted to be secured to said implement operating hydraulic ram, the lower end of said elongated support element being provided with a reduced end portion of angular section, and a shoe having an angular recess that fits over said reduced end portion, aligned openings in said shoe and in said reduced portion, a chopping blade mounted on said shoe, said shoe being provided with a backing block on its lower surface and said chopping blade being removably secured to said lower surface against said backing block, and said shoe being secured to said reduced portion by means of a bar inserted through said aligned openings in said shoe and through said reduced portion.

References Cited in the file of this patent

UNITED STATES PATENTS

| | | |
|---|---|---|
| 2,295,458 | Edwards | Sept. 8, 1942 |
| 2,652,639 | Kluckhohn | Sept. 22, 1953 |
| 2,674,818 | Carnes | Apr. 13, 1954 |
| 2,717,704 | Pilch | Sept. 13, 1955 |
| 2,755,570 | Blackburn et al. | July 24, 1956 |
| 2,766,535 | Ralston | Oct. 16, 1956 |